United States Patent [19]

Eckerson

[11] Patent Number: 4,524,536
[45] Date of Patent: Jun. 25, 1985

[54] FISHING LURE RETRIEVER

[76] Inventor: Richard L. Eckerson, 415 Corunna Ave., Owosso, Mich. 48867

[21] Appl. No.: 542,753

[22] Filed: Oct. 17, 1983

[51] Int. Cl.³ .............................................. A01K 97/00
[52] U.S. Cl. ...................................................... 43/17.2
[58] Field of Search ........................................ 43/17.2

[56] References Cited

U.S. PATENT DOCUMENTS 3,531,887 10/1970 Bortle .................................... 43/17.2
3,830,005 8/1974 Kimbrough ........................... 43/17.2

Primary Examiner—Nicholas P. Godici
Assistant Examiner—C. McKee
Attorney, Agent, or Firm—Barnes, Kisselle, Raisch, Choate, Whittemore & Hulbert

[57] ABSTRACT

A fishing lure retriever for disengaging a lure with fish hooks from an obstacle comprising a heavy main body in the form of a sphere, a fishing line guide extending from the main body and engageable by the fishing lure for guiding the main body along the fishing line, handling line, attached to the body at a point spaced from the guide, and a hook engaging body extending outwardly from said main body at a point spaced from said guide and the attachment of the handling line. The hook engaging body defines a surface extending radially outwardly from the main body such that when the fish lure is lodged in an obstruction, the retriever is first engaged with the fishing line by engaging the guide with the fishing line, the handling line is then utilized to guide the retriever under the weight of the main body downwardly along the fishing line and when the main body approaches the fishing lure it applies a force tending to dislodge the fishing lure from the obstruction and to move the hook engaging body into engagement with the hooks of the fish lure so that the fish lure can be retrieved by lifting the handling line.

16 Claims, 6 Drawing Figures

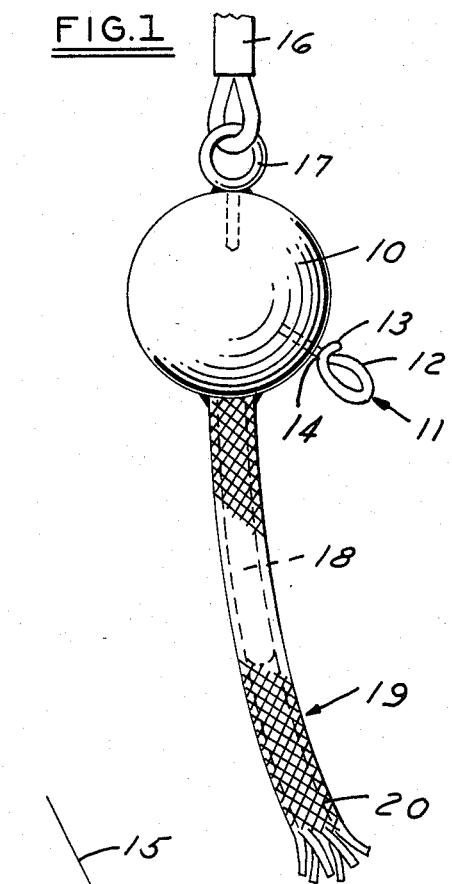
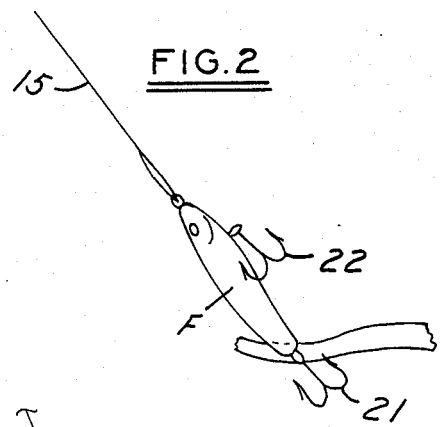
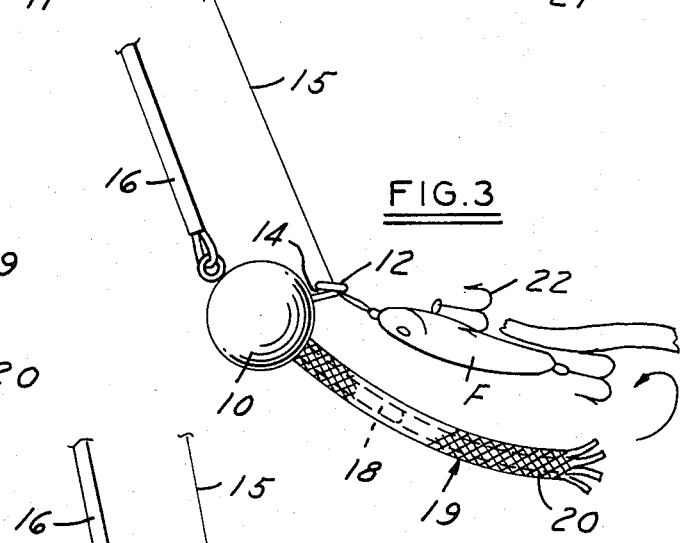
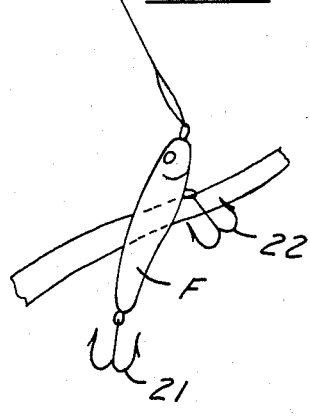
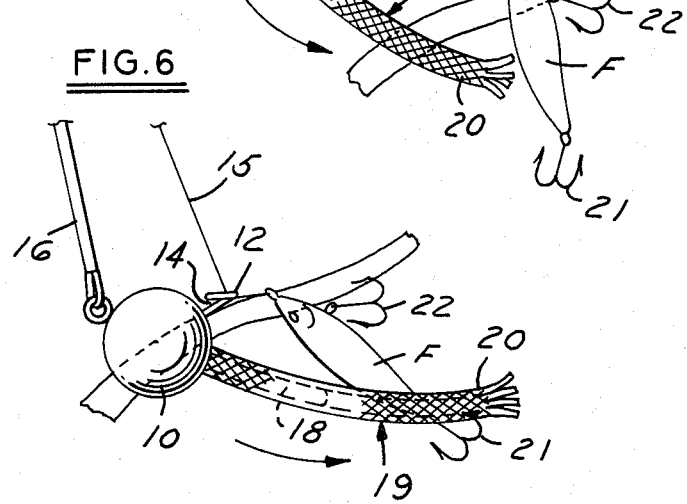

FISHING LURE RETRIEVER

This invention relates to fishing lure retrievers.

BACKGROUND AND SUMMARY OF THE INVENTION

A long standing and common problem of the sport of fishing is the tendency of fishing lures with hooks to become lodged in logs or other obstructions and when an attempt is made to retrieve the lure, the fishing line is broken and the lure is lost.

Various fishing lure retrievers have been suggested. For example, U.S. Pat. No. 2,940,203 has suggested the provision of a wire frame on the end of a handle or pole which is guided along the fishing line to the lure. U.S. Pat. No. 3,296,730 has suggested a ring that includes teeth for engaging the body of the lure. U.S. Pat. No. 3,531,887 shows a ring that has an open mesh sleeve thereon which is guided along the fishing line to the fishing lure. U.S. Pat. No. 3,830,005 shows a large open mesh frame made of metal bars that is guided along the fishing line to engage a plurality of lures.

Among the objectives of the present invention are to provide a fishing lure retriever which more effectively and successfully retrieves the fishing lures, which is low in cost, which is relatively small, and which operates in a different manner to engage and retriever the fishing lure.

In accordance with the invention, the fishing lure retriever for disengaging a lure with fish hooks from an obstacle comprises a heavy main body, preferably in the form of a sphere, a fishing line guide extending from the main body and engageable by the fishing line for guiding the main body along the fishing line, a handling line attached to the body at a point spaced from the guide, and a hook engaging body telescoped over a post extending outwardly from said main body at a point spaced from said guide and the point of attachment of the handling line. The hook engaging body defines a surface and preferably comprises a tubular braid rope extending radially outwardly from the main body. When the fish lure is lodged in an obstruction, the retriever is first engaged with the fishing line by engaging the guide with the fishing line, the handling line is then utilized to guide the retriever under the weight of the main body downwardly along the fishing line and when the main body approaches the fishing lure it applies a force tending to dislodge the fishing lure from the obstruction and to move the hook engaging body into engagement with the hooks of the fish lure so that the fish lure can be retrieved by lifting the handling line.

DESCRIPTION OF THE DRAWINGS

FIG. 1 is an elevational view of the fishing lure retriever.

FIGS. 2-6 are diagrams showing the manner in which the fishing lure functions in operation.

DESCRIPTION

Referring to FIG. 1, the fishing lure retriever embodying the invention preferably comprises a heavy main body 10 of a material having a large density such as lead or zinc, preferably in the shape of a sphere. A guide 11 extends radially from the main body 10 and has a guide loop 12 with a free overlapping end 13 defining a space 14 such that the fishing retriever can be engaged with the main fishing line 15. A holding line 16 is connected to a closed loop 17 extending radially from the main body 10. A post 18 extends generally radially outwardly from the main body 10 and a hook engaging body 19 adapted to engage and hold a hook. The body 19 is preferably in the form of a woven sleeve of plastic, preferably nylon strands, is telescoped over post 18 and extends beyond the free end of the post 18. The inner end of the sleeve 19 is fixed to the body 10 and the post 18 as by utilization of an epoxy resin. The outer end 20 of the sleeve preferably comprises loose strands extending in various directions to augment the action of the retriever. The portion of the sleeve 19 that extends beyond the post 18 may flex. Post 18 preferably forms a small angle with a radius of the ball and an acute angle with the shaft of guide 11, the shaft of guide 11 forms an obtuse angle with shaft of loop 17. Post 18 and the shafts of guide 11 and loop 17 generally lie in a common plane.

The guide 11, loop 12 and post 18 are fixed in the main body as by threading a shaft thereon into the body and utilizing a bonding agent such as epoxy resin to lock the shaft in position.

In a typical fishing lure retriever, the body 10 comprises a ball having a diameter of about 1¼", the post 18 has a diameter of about ¼" and a length of 2–3 inches and the hook engaging body 19 comprises braided rope made of 1/16" nylon strands and having a diameter of about ½", the length of the rope is about 6".

In use, when a fishing lure is hooked on an obstruction, the fishing lure retriever is engaged with the fishing line by engaging with the guide 11 and the holding line 16 is utilized to lower the fishing lure retriever down the fishing line 15. During this time, the weight of the body 10 causes the post 18 and hook engaging body 19 to extend generally parallel to the fishing line. Referring specifically to FIGS. 2 and 3, the lure F is shown in FIG. 2 as being hooked by engagement of the back or rear hook 21 with a branch. The fishing lure retriever is engaged with the fishing line and guided downwardly along the fishing line 15. As the retriever reaches the lure F, the body 10 swings as it moves further downwardly disengaging the rear hook from the branch so that the lure F can be retrieved. The braided body 19 may also engage the hooks 21.

When the front hook 22 of a lure is engaged with an obstruction such as a branch as shown in FIG. 5 as the fishing lure retriever moves down the fishing line and reaches the fishing lure F, the braided body 19 tends to engage the hooks on the line and the heavy main body 10 applies a force to the lure F in an oscillating fashion tending to disengage the lure F from the obstacle or obstruction.

I claim:

1. A fishing lure retriever for disengaging a lure with fish hooks from an obstacle comprising
   a heavy main body,
   a fishing line guide extending from same main body and engageable by the fishing line for guiding the main body along the fishing line,
   means for attaching a handling line to the body at a point spaced from the guide,
   a post extending outwardly from said main body at a point spaced from said guide and said means for attachment of the handling line,
   a hook engaging body being telescoped over said post,
   said hook engaging body defining a surface extending radially outwardly from the main body such that when the fish lure is lodged in an obstruction, the retriever is first engaged with a fishing line by engaging the guide with the fishing line, the handling line is then utilized to lower the retriever under the weight of the main body downwardly along the fishing line and when the main body approaches the fishing lure is applies a force tending to dislodge the fishing lure from the obstruction and to move the hook engaging body into engagement with the hooks of the fish lure so that the fish lure can be retrieved by lifting the handling line.

2. The fishing lure retriever set forth in claim 1 wherein said hook engaging body extending beyond the free end of the post.

3. The fishing lure retriever set forth in claim 2 wherein said hook engaging body comprises a tubular sleeve of woven strands.

4. The fishing lure retriever set forth in claim 3 wherein said strands are made of plastic material.

5. The fishing lure retriever set forth in claim 3 wherein said strands comprise nylon.

6. The fishing lure retriever set forth in claim 3 wherein said strands include free ends extending at random on the free end of said hook engaging body.

7. The fishing lure retriever set forth in claim 1 wherein said main body is spherical.

8. The fishing lure retriever set forth in claim 1 wherein said guide and said means for attachment are spaced from one another at an obtuse angle.

9. The fishing lure retriever set forth in claim 1 wherein said hook engaging body extends substantially radially from said main body at an acute angle to the guide means.

10. The fishing lure retriever set forth in claim 7 wherein said post forms an acute angle with a radius of the main body.

11. The fishing lure retriever set forth in claim 1 wherein said post, guide and means for attachment of said holding line generally lie in a common plane.

12. A fishing lure retriever for disengaging a lure with fish hooks from an obstacle comprising a heavy main body in the shape of a sphere, a fishing line guide extending from said main body and engageable by the fishing line for guiding the main body along the fishing line, means for attaching a handling line to the body at a point spaced from the guide, a post extending generally radially from said body at a point spaced from said guide and said means for attachment of the handling line, and a hook engaging body telescoped over said post extending outwardly from said main body, said hook engaging body defining a surface extending radially outwardly from the main body, said guide and said means for attachment being spaced from one another at an obtuse angle, said post extends from said main body at an acute angle to the guide means such that when the fish lure is lodged in an obstruction, the retriever is first engaged with a fishing line by engaging the guide with the fishing line, the handling line is then utilized to lower the retriever under the weight of the main body downwardly along the fishing line and when the main body approaches the fishing lure it applies a force tending to dislodge the fishing lure from the obstruction and to move the hook engaging body into engagement with the hooks of the fish lure so that the fish lure can be retrieved by lifting the handling line.

13. The fishing lure retriever set forth in claim 12 wherein said hook engaging body comprises a tubular rope woven from strands made of plastic material.

14. The fishing lure retriever set forth in claim 13 wherein said strands comprise nylon.

15. The fishing lure retriever set forth in claim 13 wherein said strands include free ends extending at random at the free end of said hook engaging body.

16. The fishing lure retriever set forth in claim 13 wherein said post forms an acute angle with a radius of the main body.

* * * * *